(12) United States Patent
Goeringer et al.

(10) Patent No.: US 12,056,691 B2
(45) Date of Patent: Aug. 6, 2024

(54) SYSTEMS AND METHODS FOR SECURELY TRACKING CONSUMABLE GOODS USING A DISTRIBUTED LEDGER

(71) Applicant: CABLE TELEVISION LABORATORIES, INC, Louisville, CO (US)

(72) Inventors: Steven John Goeringer, Westminster, CO (US); Brian Alexander Scriber, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 77 days.

(21) Appl. No.: 15/722,277

(22) Filed: Oct. 2, 2017

(65) Prior Publication Data

US 2018/0096347 A1    Apr. 5, 2018

Related U.S. Application Data

(60) Provisional application No. 62/402,271, filed on Sep. 30, 2016.

(51) Int. Cl.
*G06Q 20/38* (2012.01)
*G06Q 10/08* (2023.01)
(Continued)

(52) U.S. Cl.
CPC ......... *G06Q 20/3825* (2013.01); *G06Q 10/08* (2013.01); *G06Q 10/0832* (2013.01); *G06Q 10/0833* (2013.01); *G06Q 20/3829* (2013.01); *G06Q 20/389* (2013.01); *G06Q 20/4014* (2013.01); *G06Q 50/22* (2013.01);
(Continued)

(58) Field of Classification Search
None
See application file for complete search history.

(56) References Cited

U.S. PATENT DOCUMENTS

2003/0236768 A1* 12/2003 Sribhibhadh ........ G06Q 10/087
2009/0273451 A1* 11/2009 Soppera ............. G06K 19/0723
340/10.4
(Continued)

FOREIGN PATENT DOCUMENTS

JP          2018022346 A  *  2/2018

OTHER PUBLICATIONS

Shafiei, N., "Impact of Industry Transformation on the Lifecycle of Pharmaceutical Products: A Science and Risk Based Perspective", PQDT—UK & Ireland, ProQuest Dissertations Publishing. (2013) (Year: 2013).*

*Primary Examiner* — Neha Patel
*Assistant Examiner* — Clay C Lee
(74) *Attorney, Agent, or Firm* — Josh C. Snider; Snider IP

(57) ABSTRACT

A tracking system for monitoring the status of a consumable good using a distributed ledger is provided. The tracking system includes a receiver subsystem configured to submit to the distributed ledger a genesis transaction encoding details regarding an original consumable good, and a distributor subsystem configured to receive at least a distribution portion of the consumable good from the receiver subsystem and submit to the distributed ledger a first update transaction, based on the genesis transaction, encoding details regarding the receipt of the distribution portion by the distributor subsystem from the receiver subsystem.

17 Claims, 1 Drawing Sheet

(51) Int. Cl.
*G06Q 10/0832* (2023.01)
*G06Q 10/0833* (2023.01)
*G06Q 20/40* (2012.01)
*G06Q 50/22* (2018.01)
*H04L 9/32* (2006.01)
*H04L 9/00* (2022.01)

(52) U.S. Cl.
CPC .......... *H04L 9/3239* (2013.01); *H04L 9/3247* (2013.01); *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 2015/0332283 | A1* | 11/2015 | Witchey | G06F 21/00 |
| | | | | 705/3 |
| 2016/0098730 | A1* | 4/2016 | Feeney | G06Q 20/20 |
| | | | | 705/71 |
| 2016/0217436 | A1* | 7/2016 | Brama | G06Q 20/10 |
| 2016/0253622 | A1* | 9/2016 | Sriram | H04L 9/3247 |
| | | | | 713/179 |
| 2017/0236143 | A1* | 8/2017 | Code | G06Q 20/387 |
| | | | | 705/14.27 |
| 2017/0262862 | A1* | 9/2017 | Aljawhari | G06F 16/90335 |
| 2018/0012311 | A1* | 1/2018 | Small | G06Q 30/0185 |

* cited by examiner

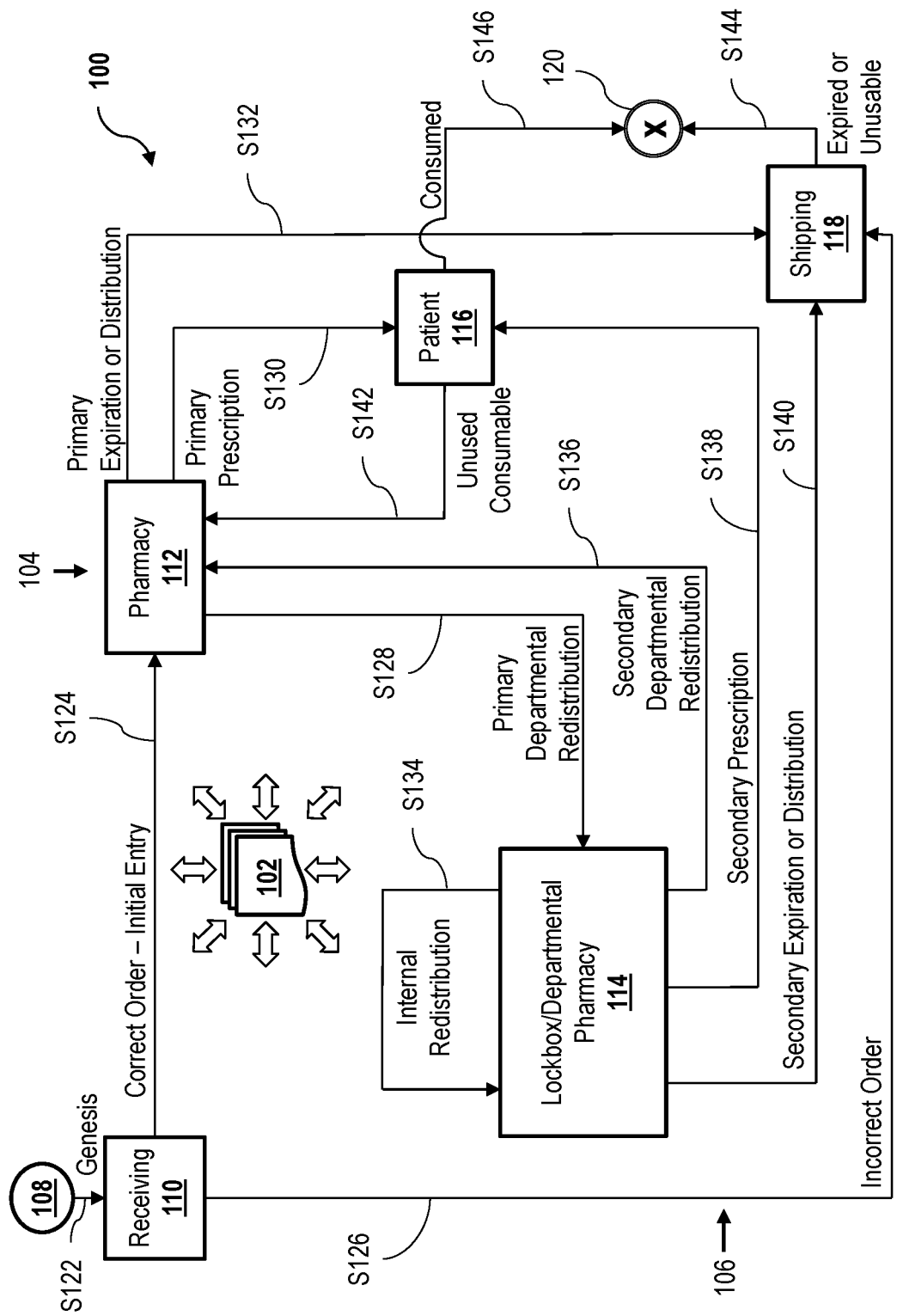

SYSTEMS AND METHODS FOR SECURELY TRACKING CONSUMABLE GOODS USING A DISTRIBUTED LEDGER

CROSS REFERENCE TO RELATED APPLICATIONS

This application claims the benefit of and priority to U.S. Provisional Patent Application Ser. No. 62/402,271, filed Sep. 30, 2016, the disclosure of which is herein incorporated by reference in its entirety.

BACKGROUND

The field of the disclosure relates generally to tracking of materials and data, and more particularly, to tracking consumable materials and data using distributed ledger technology.

Loss, misuse, and theft of materials and data is a critical problem in many industries. Furthermore, the details of how such material and data are used, and by which people, is important to know. This problem is more pronounced when the material and/or data are "consumable goods," that is, materials or data products that are capable of being consumed, destroyed, dissipated, wasted, or spent. In one particular example, in the field of pharmaceutical materials, it may be very important, for insurance and safety reasons, to have information pertaining to the details of how opioids traverse a medical environment. Particular individuals may have a significant incentive to falsify records of how such materials, as well as associated data, are used in order to, for example, hide evidence of theft or other crimes, and/or acts of negligence or malpractice. Conventional methods, which rely on manual processes augmented by traditional databases, do not provide sufficient security transparency and visibility to attest confidently the disposition of critical materials as they traverse a system.

Accordingly, it is desirable to create a more secure system to track consumable goods through their limited life cycle, while also increasing security and transparency.

BRIEF SUMMARY

In an aspect, a tracking system for monitoring the status of a consumable good using a distributed ledger is provided. The tracking system includes a receiver subsystem configured to submit to the distributed ledger a genesis transaction encoding details regarding an original consumable good, and a distributor subsystem configured to receive at least a distribution portion of the consumable good from the receiver subsystem and submit to the distributed ledger a first update transaction, based on the genesis transaction, encoding details regarding the receipt of the distribution portion by the distributor subsystem from the receiver subsystem.

In another aspect, a method of tracking the status of an original consumable good is provided. The method implements a digital distributed ledger having a plurality of participating processors over a distributed network. The method includes a step of generating a digitally signed genesis transaction to the plurality of participating processors for verification. The genesis transaction includes encoded information confirming an initiation of a life cycle of the original consumable good by a receiver. The step of generating further includes submitting the genesis transaction to the digital distributed ledger for verification. The method further includes a step of delivering, after verification of the digitally signed genesis transaction, a distribution portion of the original consumable good to a distributor, and generating a delivery transaction to the digital distributed ledger for verification. The delivery transaction includes encoded information confirming delivery of the distribution portion to the distributor. The method further includes a step of distributing, after verification of the delivery transaction, a consumption portion of the distribution portion to a consumer, and generating a distribution transaction to the digital distributed ledger for verification. The distribution transaction includes encoded information confirming receipt of the consumption portion by the consumer. The method further includes a step of recording, after verification of the distribution transaction, a consumption transaction including encoded information regarding a final disposition of the consumption portion.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

FIG. 1 is a schematic illustration of a tracking system that utilizes a digital ledger to securely monitor the status of consumables among various parties over a plurality of transactions, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The present systems and methods herein advantageously utilize distributed ledgers to confirm and/or record the status of consumable goods during their respective life cycle, from creation to consumption. The present embodiments may be implemented to augment or, in some circumstances, replace conventional tracking and security practices that rely on trusted parties to manually record events into databases or other record keeping mechanisms, such as trusted labels or tags, including bar codes, RFID tags, or other device identification methods. The distributed ledgers described and illustrated herein may include, for example, blockchain technology to create digital ledgers for tracking the status, location, and/or disposition of consumable goods. For ease of explanation, the following description references blockchains as an exemplary embodiment of distributed ledger technology. A person of ordinary skill in the art though, upon reading and comprehending the present description and associated illustrations, will understand that other examples of distributed ledger technologies may be implemented according to the novel and advantageous principles herein.

That is, in the following disclosure, the phrases "distributed ledger" and "blockchain" are used. In conventional practice literature, these two concepts are often considered to be synonymous. However, within this application, the two concepts may further differ in terms of their respective use and implementation. For example, in some instances the phrase "distributed ledger" may refer to how the ledger or blockchain is used, namely, the accessible distributed ledger as available to prove the facts of a transaction by virtue of being distributed amongst a consensus pool. A "blockchain," on the other hand, may refer to the process by which the distributed ledger is created and operated. Accordingly, a blockchain will create a distributed ledger, but a distributed ledger may be created by other technologies as well. In the following description, the phrase "digital ledger" is utilized two referred to either or both of the distributed ledger and the blockchain.

The present solutions are thus advantageously implemented as either standalone systems, or as complementary systems to conventional recording systems that rely on trusted parties manually recording events into databases or other record keeping mechanisms, often using trusted labels. In such systems, it is important to track and verify information (e.g., specific times, location, duration, quantity, status etc.) of consumable goods move through/traverse a physical system or telecommunications network. The present embodiments are therefore of particular application to fields such as medical consumables (e.g., drugs and pharmaceuticals), law enforcement paraphernalia, contracts, and other fields where the consumable goods are often critical and/or of high value. In some embodiments, registration of the status of goods on the distributed ledger or blockchain may be implemented together with conventional identification and authentication processes, such as bar code scanning, RFID tagging, near field communications, biometrics, manual entries, etc.

According to the embodiments herein, digital ledgers are implemented to create secure and immutable records of transactions regarding the movement or status of consumable goods, or "consumables." In these records, the transaction information is encoded into formats, digitally signed using a cryptographic technique, and submitted to a network of processors of a distributed ledger network. The processors validate the submitted transactions for accuracy, and the validated transactions are subsequently added to a queue or stack of the ledger. At some point, according to a predetermined criterion (such as, but not limited to, an interval of time, a volume of data, a number of transactions, or combination of these and other factors), the queued or stacked transactions are sequentially hashed (e.g., using a Merkle process), and collectively encoded into a block which is then hashed with the hash of the proceeding block using cryptographic processes. An algorithm will allow multiple processors to select a block from amongst many processors to be the block added to the blockchain.

In an exemplary embodiment, the distributed ledger is a blockchain. Blockchaining technology takes transaction information, encapsulates it in a digital envelope or "block" and then the block is cryptographically added (using cipher chaining techniques) to the end of a chain of other transactions. This cryptographic addition incorporates information from prior blocks on the chain to calculate the digital chain or "hash" for this new block. The calculations for cryptographic addition can vary widely in complexity based on the rules of the blockchain. This complexity is purposeful though, in order to prevent modification of the existing blockchain to which is being added. That is, in order to modify an earlier block in the chain, the entire chain from that point forward would need to be recalculated. It is through this technique that the immutability of the chain, and permanency of its public ledger, is maintained. Exemplary systems and methods of blockchain technology are described in greater detail in co-pending U.S. patent application Ser. No. 15/345,411, filed Nov. 7, 2016, U.S. patent application Ser. No. 15/376,375, filed Dec. 12, 2016, U.S. patent application Ser. No. 15/476,111, filed Mar. 31, 2017, and U.S. patent application Ser. No. 15/476,098, filed Mar. 31, 2017, all of which are incorporated by reference herein.

In the following embodiments, digital ledgers are utilized and/or created to track the status and movement of consumable goods. In an exemplary embodiment, the digital ledger is implemented to reliably record the status of one or more consumable from the time of reception from a manufacturer through a final state of consumption or disposal. According to the advantageous systems and methods described herein, the digital ledger may be utilized to automatically supplement, or substitute for, conventional practices that rely on trusted parties to manually record events into databases or other electronic record keeping mechanisms. In some embodiments, the present systems and methods utilize their own unique device technology to identify a person for association with one or more devices. In other embodiments, the present systems and methods may be implemented utilizing existing trusted identification technology, such as barcodes, RFID tags, biometric identifiers, etc.

The embodiments described herein are particularly useful for reliably associating critical devices with a particular person in the fields of medicine and law enforcement, smart contracts, and intellectual property (e.g., content-as-currency), for example. As described herein, details of transaction events (e.g., current status, changes in status) for a particular consumable good are encoded into a cryptographically signed and protected transaction that is submitted to a distributed ledger network, such as a blockchain network, for further processing. Processors of the distributed network process the incoming transactions into blocks, which may then be added to a particular blockchain. Once added to the blockchain (or equivalent entry in an electronic distributed ledger), the transaction is visible to, but immutable by, appropriate parties that seek to create a history of disposition and movement of critical goods for their respective life cycles. Such histories may then be more easily verified on the ledger, while being rendered more difficult to alter once added to the ledger. In some embodiments, the ledgers further track the association of persons to devices utilized in the system.

FIG. 1 is a schematic illustration of a tracking system 100 that utilizes a digital ledger 102 to securely monitor the status of consumables among various parties 104 as the consumables traverse system 100 over a plurality of transactions 106. System 100 is illustrated as an exemplary architecture to implement the distributed ledger embodiments of the present disclosure. Other architectures are contemplated by the present inventors, which do not depart from the scope of the embodiments. Furthermore, for ease of explanation, redundant components that may be implemented within system 100 are not illustrated, nor are link-level objects or implementations, security authentication objects/sequences/implementations, or other components that may be conventionally utilized in a distributed ledger network for communication, availability, or security purposes. In an exemplary embodiment of system 100, transaction events are communicated by nodes (not shown) respectively associated with one or more of parties 104, which are configured to communicate with processors (not separately shown) of digital ledger 102.

In the exemplary embodiment illustrated in FIG. 1, transactions, or steps, 106 are described relative to how the respective transaction 106 is submitted to, and recorded on, digital ledger 102. Individual process steps that may also be performed by parties 104, or persons and/or devices associated therewith are not shown. That is, system 100 is described herein primarily with respect to the interaction with digital ledger 102, and is not intended to describe all other potential processing steps for initiating, validating, and appending transactions to digital ledger 102 that may be performed by persons (e.g., manual entries) or other devices (e.g., data transmissions, communication protocols, etc.), as described above with respect to the co-pending patent applications incorporated by reference. For the purposes of this written description, the terms "material and data," "consumable goods," and "consumables" may be used interchangeably.

In some embodiments, digital ledger 102 utilizes a certificate authority (not shown) as a trusted entity in order to validate digital signatures against electronic documents and/or digital certificates issued by the certificate authority to verify the identity of one or more of parties 104 for each transaction 106. Such digital certificates may, for example, be implemented according to secure communication techniques such as a conventional public key infrastructure (PKI). In the exemplary embodiment, parties 104 include electronic communication means capable of wired or wireless electronic communication over the Internet.

The following exemplary implementation of system 100 is described with respect to medical consumables. Nevertheless, a person of ordinary skill in the art will understand, upon reading and comprehending the present application, how the principles of system 100 apply to other fields (e.g., law enforcement, smart contracts, etc.) where securely and transparently tracking the status and the physical or virtual movement of a consumable is valuable. Further in the exemplary embodiment, digital ledger 102 is a blockchain network, or a blockchain, and system 100 leverages digital signatures/hashes and/or Merkle roots/trees to reliably monitor and track the consumable status and movement using the blockchain.

In the exemplary embodiment of system 100 illustrated in FIG. 1, parties 104 include one or more of an originator 108, a receiver 110, a distributor 112, at least one storage facility 114, a consumer system 116, a shipping facility 118, and a resolution state 120. In this example, originator 108 is a pharmaceutical manufacturer, receiver 108 is a medical facility or pharmacy central office, distributor 112 is a dispensing pharmacy, consumer system 116 is a medical patient, and shipping facility 118 is an order processing unit or distribution center of originator/manufacturer 108 that is capable of shipping and receiving consumables. Although originator 108 and shipping facility 118 represent, in this example, the same manufacturer, two separate parties 104 are illustrated in FIG. 1 to emphasize the different roles of an original consumable order, as oppose to a returned consumable, and the different (albeit somewhat interrelated) transactions 106 respectively created therefrom.

In some embodiments of system 100, some or all of parties 104 are in direct or indirect operable communication with an electronic communications network (e.g., Internet, LAN, WAN, etc.). In at least one embodiment, one or more of parties 104 is further in operable communication with a certificate authority (not shown), where access to, or verification of, digital certificates is desired. That is, a certificate authority may be utilized to verify the digital identities of the respective parties 104 on the electronic communications network and issue a digital certificate to function as a trusted root certificate (e.g., embedded in hardware or software of the one or more parties 104) for transactions 106. In the exemplary embodiment, digital ledger 102 is a blockchain, and PKI-based certificates are utilized to implement secure communication between and authentication of parties 104 for each transaction 106.

In exemplary operation, each transaction is submitted to blockchain 102, verified by the processors of the blockchain (e.g., by a consensus model), and then recorded as new blocks onto the ledger of blockchain 102. In this example, each of parties 104 includes a party-specific identifier (ID) that may be digitally verified by the blockchain for each respective transaction 106. Patient 116, for example, may include a wearable coded wristband if a patient in a hospital, or alternatively, may carry a physical ID (e.g., a driver's license) that is capable of being scanned or recorded by pharmacy (distributor) 112 and then digitally verified by blockchain 102.

In exemplary operation, in step S122, originator 108 initiates a shipment of new consumables to receiver 110. Shipment step S122 generates a genesis transaction that digitally records details of the shipment, including without limitation, a manufacture ID, quantities, units of measure, perishability, recipient IDs, location, use restrictions, time, date, and physical location (alternatively, a virtual location in the case of data consumables) of both originator 108 and receiver 110. In the exemplary embodiment, the information of the recorded details is encoded into the genesis transaction, and the genesis transaction is digitally signed. The genesis transaction is subsequently submitted to the network of blockchain processors for validation and recording to blockchain 102.

The genesis transaction includes information and detail sufficient to authenticate and identify originator 108 and receiver 110, as well as particular characteristics specific to track shipment step S122, and thus enables subsequent transition steps between parties 104 to be similarly submitted to, verified by (e.g., validating the digital signature), and recorded on blockchain 102 as the associated consumable traverses system 100. In an exemplary embodiment, one or both of originator 108 and receiver 110 is notified if the genesis transaction is not validated. In at least one example, the shipment does not leave originator 108 if the genesis transaction is not validated, or alternatively, if the shipment has been sent, the notification allows receiver 110 to refuse delivery. In step S122, upon validation of the genesis transaction, receiver 110 accepts shipment, and the delivery acceptance is submitted to, validated by, and recorded on blockchain 102.

In some embodiments, the genesis transaction is created by receiver 110 upon receipt of the consumable, and includes only encoded details regarding originator 108, but the ID of receiver 110 may be used as both the sender and recipient ID of the genesis transaction. In one example, where receiver 110 is a hospital, the genesis transaction may be created upon a re-start or re-certification date of a piece of medical equipment that is appropriately re-used or recycled (e.g., a dialysis machine after overhaul and sterilization procedures are fully implemented). In this example, the use of the medical equipment is the consumable good (i.e., the digital data recording the life cycle of the equipment use), and the genesis transaction is generated upon the start of each new original use/re-use, or the re-use of the equipment may create its own update transaction event, reflecting the relevant subsequent date and other usage details, that is based on the genesis transaction for the life cycle of the equipment used in system 100.

Upon receipt of the consumables, a determination is made by receiver 110 (assuming validation of the genesis transaction) whether the consumables shipment was shipped correctly in step S122 (e.g., correct product, quantities, etc.). If the determination is made that the received shipment is correct, receiver initiates step S124, in which an initial entry transaction is generated and submitted to blockchain 102, along with relevant details of the received consumable(s), which are encoded into the initial entry transaction and recorded on the ledger, and then the original shipment is delivered to distributor 112. In some instances, the entirety of the original shipment may not sent to a single distributor, and instead split among a plurality of distributors 112. Under such circumstances, in step S124, receiver 110 will generate a plurality of initial entry transactions from the single genesis transaction, with each initial entry transaction respectively encoded with a different recipient ID of the respective distributor 112, as well as other different details of the sub-shipment that are relevant to that particular portion of the consumables. Each of the plurality of initial entry transactions may then be separately submitted to, validated by, and added to the ledger of block chain 102.

Referring back to step S122, if receiver 110 instead determines that that the original shipment was not shipped correctly, receiver 110 initiates step S126, in which the shipment of consumables is returned to shipping facility 118. In this example, step S126 further generates an incorrect order transaction, in which will be encoded the respective IDs of recipient receiver 110 and shipping facility 118 (e.g., a shipping manager of originator 108), and shipping facility 118 will initiate a distribution transaction, including details of receipt of the return delivery, as well as discrepancies between an original order and the original shipment received in step S122, and submit the distribution transaction to the block chain for validation and recording. In this example, the distribution transaction may update original data in the genesis transaction by appending corrected details in a subsequent block on a block chain 110. That is, the original genesis block of the genesis transaction will remain immutable, but subsequent blocks, added from the distribution transaction, will indicate the modification to the genesis transaction.

Referring back to the receipt of consumables by pharmacy 112 in step S124, upon validation of receipt according to the initial entry transaction, pharmacy 112 makes a determination that the received consumables are: (i) subject to immediate storage by storage facility 114; (ii) designated for immediate consumption by patient 116; or (iii) expired, or otherwise unusable. Details of this determination are encoded into one of the following transactions, which is initiated based on the result of the determination. In some embodiments, originator 108 may ship a consumable directly to pharmacy 112, and receiver 110 does not physically receive the consumable. In this example, receiver functions to generate the genesis transaction and the initial entry transaction. Receiver 110 may thus, in some instance, represent a processor of pharmacy/distributor 112.

If pharmacy 112 determines that the received consumables (or a portion thereof) are subject to immediate storage, system 100 initiates step S128, in which a primary departmental redistribution transaction is generated, and the received consumables are delivered to storage facility 114. In some embodiments, storage facility 114 is a plurality of storage facilities, and the consumables delivered in step S128 are split evenly or unevenly among one or more of the plurality of storage facilities 114. In such instances, a plurality of respective primary departmental redistribution transactions are initiated for each separate delivery, with each respective primary departmental redistribution transaction encoding therein the pharmacy/distributor ID, the respective recipient storage facility ID, and other details of the transaction relevant to the specific delivery of the portion of consumables to the particular storage facility 114. In at least one embodiment, step S128 further encodes, within the one or more primary departmental redistribution transactions, details regarding any division of the quantity of consumables received by pharmacy 112 into the respective sub-portions sent to the one or more storage facilities 114. All of these details are submitted to blockchain 102 as either a single transaction, or as multiple sub-transactions, for validation and addition to the ledger.

Alternatively, if pharmacy 112 determines that the received consumables (or a portion thereof) are designated for immediate consumption, system 100 initiates step S130, in which a primary prescription transaction is generated, and all or some of the consumables received by pharmacy 112 are delivered to consumer/patient 116. In step S130, prescription transaction encodes details of the pharmacy ID, the patient ID (e.g., hospital wristband, driver's license, etc., which is typically verified by pharmacy 112) and other relevant details of the delivery, including without limitation, time, date, location of delivery, insurance payment information, patient payment information, and refill information. All such details are then submitted to blockchain 102 as a single transaction or multiple sub-transactions for validation and addition to the ledger.

In some instances of step S130, the quantity of consumables received by pharmacy 112 is designated for immediate consumption by a plurality of patients 116 in equal or unequal quantities. In such circumstances, a plurality of primary prescription transactions are generated by pharmacy 112 for each respective prescription delivery to a different patient 116, similar to the subprocess described above with respect to the plurality of storage facilities 114. That is, each respective primary prescription transaction may be separately encoded with the relevant details particular to that primary prescription transaction (e.g., patient ID, quantity, and other details are likely to vary) and submitted to blockchain 102 for validation and entry based on the same genesis transaction and initial entry transaction.

Referring back to the determination made by pharmacy 112 after validation of step S124, in some instances, the determination is made that all or some of the received consumables are expired or otherwise unusable, and pharmacy 112 will then generate a primary expiration transaction, and the relevant portion of expired/unusable consumables are delivered to shipping facility 118 for appropriate resolution. Relevant details of the primary expiration transaction are then submitted to blockchain 102 for validation and appending thereto.

Referring back to the receipt of consumables by storage facility 114 in step S128, upon validation of the departmental redistribution transaction thereof, storage facility 114 makes a determination that the received consumables are: (i) subject to internal redistribution within storage facility 114; (ii) subject to secondary departmental redistribution to pharmacy 112; (iii) designated for immediate consumption by patient 116; or (iv) expired, or otherwise unusable. Details of this determination are encoded into one of the following transactions, which is initiated based on the result of the determination. In this example, pharmacy 112 may represent a hospital with a central pharmacy, and storage facility 114 may represent one or more departmental pharmacies and/or ward lockboxes of the hospital, and the received consumables will typically be stored under secure conditions by trusted parties.

If storage facility 114 determines that the received consumables (or a portion thereof) are subject to internal redistribution, system 100 initiates step S134, in which an internal redistribution transaction is generated, and the received consumables are redistributed within storage facility 114. In some embodiments of step S134, the internal redistribution transaction represents a physical relocation of all or part of the stored consumable, e.g., from one lockbox to another. In other embodiments of step S134, the internal redistribution transaction may represent only an update of the status of the consumable in storage facility 114, such as from an inventory check, where the physical location of the consumable may not change, but encoded details of the inventory check may reflect a new time, date, and/or trusted party, etc. In all such instances, details of the internal redistribution transaction are submitted to blockchain 102, as a single transaction or as multiple sub-transactions, for validation and addition to the ledger.

In the exemplary embodiment, the internal redistribution transaction of step S134 will encode the same ID for both the deliverer and the recipient of the consumables. In some embodiments though, the internal redistribution transaction may include different IDs for other encoded details such as, for example, where the idea of a trusted party that receives the consumables at storage facility 114 may be different from the idea of a different trusted party who performs a subsequent inventory, or internal physical transfer, of the same consumable. In the case where the consumable is data, the internal redistribution transaction of step S134 may be, for example, submitted to blockchain 102 for each instance where a data file is moved (within the same data storage subsystem), renamed, opened, viewed, or otherwise accessed. According to step S134, such internal department distribution transactions allow for tracking of materials transferred between various locations, as well as between various trusted parties, of a single facility. In the embodiments described herein, the recorded transaction encodes an amount of the consumables that is returned to a particular storage areas, or even original storage area, in the case when, for example, an entire quantity of the consumable may have to be removed from storage to measure and count only a portion thereof for delivery (e.g., a pharmacist removing a larger container of a pharmaceutical to dose a limited quantity thereof to a patient, and then returning the larger container having the unused portion of the pharmaceutical to the same storage location).

If storage facility 114 alternatively determines, after validation of step S128, are subject to redistribution or return to pharmacy 112, storage facility 114 of system 100 initiates step S136, in which a secondary departmental redistribution transaction is generated, and the received consumables are delivered from storage facility 114 back to pharmacy 112. In step as 136, the secondary departmental redistribution transaction further encodes, similar to the transactions described above, details regarding the quantity of consumables returned to pharmacy 112. All such details are submitted to blockchain 102 as a single transaction or multiple sub-transactions for validation and addition to the ledger.

In another alternative, if storage facility 114 determines that some or all of the received consumables are designated for immediate consumption by patient 116 (or multiple patients 116), step S138 is initiated, in which a secondary prescription transaction is generated, and all or some of the consumables received by storage facility 114 are delivered to patient 116 in a manner similar to the primary prescription transaction and delivery in step S130, including potential delivery to a plurality of patients 116. The details of the secondary prescription transaction(s) are then submitted to blockchain 102 in a similar manner as are the details of the primary prescription transaction. In other words, when a stored consumable is directly consumed from storage, a transaction (the secondary prescription transaction in this example) is generated between the storage ID and consumer ID, and undelivered portions of the consumables, or other changes to the condition/status of the remaining consumables are noted/encoded in a subsequent transaction.

Referring back to the determination made by storage facility 114 after validation of step S128, in some instances, the determination is made that all or some of the received consumables are expired or otherwise unusable, and storage facility 114 will then generate a secondary expiration transaction, and the relevant portion of expired/unusable consumables are delivered to shipping facility 118 for appropriate resolution. Relevant details of the secondary expiration transaction are then submitted to blockchain 102 for validation and appending thereto.

Referring back to the receipt of consumables by patient 116 after validation of step S130, in some instances, some or all of the received consumables may not be used, and subject to return to pharmacy 112 (e.g., in the case of controlled substance pharmaceuticals). Upon such determination, in step S142, patient 116 returns the unused consumable to pharmacy 112, and an unused consumable transaction is generated by system 100—typically by pharmacy 112—and relevant details of the unused consumable transaction are submitted to blockchain 102 for validation and appending thereto.

And storage facility 114 will then generate a secondary expiration transaction, and the relevant portion of expired/unusable consumables are delivered to shipping facility 118 for appropriate resolution. Relevant details of the secondary expiration transaction are then submitted to blockchain 102 for validation and appending thereto.

Upon validation of one of steps S126, S132, or S140, confirming the receipt of a consumable at shipping facility 118, in step S144, shipping facility 118 generates a disposal transaction to initiate delivery of the received consumable to resolution state 120. In some embodiments, resolution state 120 represents a separate and secure disposal facility for verifiably disposing of the received consumable, and according to local, state, federal, and/or international regulations where applicable. In other embodiments, shipping facility 118 includes an internal facility or capability to dispose of the received consumable in, or transition the received consumable to, resolution state 120. In the exemplary embodiment, the disposal transaction performed in step S144 is submitted to blockchain 102 as a destruct transaction, which, upon validation and addition to the ledger, renders further transactions (i.e., for the relevant portion of consumables received by shipping facility 118) on blockchain 102 impossible.

Nevertheless, the transition to resolution state 120 does not remove transactions, sub-transactions, details, or other entries from blockchain 102, even after physical destruction of the respective consumable at shipping facility 118 (or in the case of data consumables, deletion thereof). The disposal/destruct transaction is itself subject to validation and recordation on blockchain 102, and serves as a final transaction entry on the ledger that designates particular details of the ledger that are appropriate to permanently retain regarding the lifecycle of the consumable (or the relevant portion thereof) from genesis to resolution state 120. Accordingly, upon validation and recording of the disposal transaction, blockchain 102 renders that portion of the consumable from the original genesis transaction unavailable for further consumption, even if the consumable is not physically destroyed. That is, blockchain 102 verifies that any portion of an original shipment that has transitioned to resolution state 120 is unavailable or further traversal of system 100, or elsewhere.

In a similar manner, referring back to the receipt of consumables as a primary prescription transaction in step S130, or as a secondary prescription transaction in step S138, upon validation of the receipt of the consumable by patient 116, in step S146, system 100 will generate a consumption transaction that indicates a transition of the relevant quantity of the received consumable to resolution state 120. In the example of a medical patient, physical consumption of a pharmaceutical will, for example, result in a final disposition of the consumable pharmaceutical. The case where patient 116 is within a hospital facility, the consumption transaction may, for example, be generated as a result of a trusted party (e.g., a doctor, nurse, etc.) or a trusted device (e.g., a drug delivery machine) attesting to the actual consumption of the pharmaceutical by patient 116. In the case where a patient receives a pharmaceutical consumable to be consumed over time (e.g., a 30-day period), the consumption transaction may, for example, be generated after the relevant time period (e.g., 30 days) has elapsed. The validation of the consumption transaction from step S146 will, similar to the disposal transaction of step S144, verify that the relevant portion of the original shipment is unavailable for further use or traversal.

Referring back to receiver 110, in some embodiments, receiver 110 further includes its own receiver storage facility (not shown), in which all or some of the original shipment received in step S122 may be temporarily stored after generation of the initial entry transaction of step S124, but prior to delivery of the original shipment, or portions thereof, to distributor/pharmacy 112. In this example, transfers to the receiver storage facility (or facilities) from receiver 110 are similar to those described above with respect to transfers from pharmacy 112 to storage facility 114, and may generate their own sub-transactions for submission, validation, and recording utilizing blockchain 102.

In some embodiments, system 100 is further configured to, upon transition of a consumable to resolution state 120 (e.g., after validation by blockchain 102 of step S144 or step S146), transmit a notification or alert to a relevant party 104 to refill, reorder, or replace the expired consumable. In the case of prescription pharmaceuticals, the notification/alert may be an electronic notification to pharmacy 112 or patient 116 to refill the prescription. In at least one embodiment, notification/alert will automatically refill the prescription upon transition to resolution state 120, e.g., after an elapse of the appropriate time period.

In at least one embodiment, system 100 is further configured to monitor each of the transaction and sub-transactions recorded on blockchain 102. Such monitoring may be periodic, or initiated upon a change of status or division of the consumable. In this embodiment, system 100 may be further configured to transmit a notification or alert to one or more of the respective parties 104 upon detection of an unauthorized change in the status/details of the respective consumable being monitored.

As described above, the embodiments herein implement distributed ledger technology, and are not limited solely to blockchains. A blockchain is theoretically perpetual, however, at a fundamental level, the notion that a particular blockchain is eternally viable (or even viable for many decades or longer) may not be a reasonable assumption, even as technology continues to improve. Furthermore, it is an unlikely expectation that all transactions within a blockchain will be able to stand on a queue or list indefinitely. Accordingly, it is contemplated herein that the systems and methods the present embodiments may further implement recovery and/or damage containment mechanisms to mitigate the effects of corruption of a monolithic blockchain or of a blockchain forest.

In the exemplary embodiments described above, blockchain 102 may implement a registration model, which may advantageously achieve centralization and provide further stability and predictability to a blockchain ecosystem. Alternatively, blockchain 102 may implement a consensus model to advantageously provide additional security to the blockchain ecosystem. In a consensus model alternative, for example, particular participant roles within the distributed ledger network may be integrated in multiple processors capable of negotiating participation and fulfillment operations collectively, utilizing either another blockchain (e.g., a management blockchain), or a consensus driven database (such as Cassandra).

In some embodiments, the security of new blockchains may be improved by including a blockchain hash from another chain, either from within a blockchain forest, or from an independent blockchain (such as Bitcoin). This separate hash may be included as part of the archival process, or may be included prior to archival from within the lifecycle of the blockchain. Accordingly, milestones of one blockchain may then be communicated and distributed to other blockchains as transactions. These new transactions can be performed at defined time intervals, at defined block heights (e.g., as part of instantiation and/or user request requirements), or associated with other activity within a blockchain forest (e.g., when another blockchain is instantiated or destroyed). An additional blockchain forest mechanism may serve to advantageously create a lattice of blockchains that is more secure than conventional monolithic implementations because adversaries of the blockchain are now required to attack multiple blockchains to perform a history attack, for example.

As described above, system 100 advantageously realizes the ability to create blockchains as necessary (e.g., the Genesis transaction), and terminate such blockchains (e.g., resolution state 120) in a straightforward manner when they are no longer needed. In contrast, conventional monolithic blockchains have been known to grow in an unbounded manner. After years of operation, the height of such conventional blockchains, their number of unspent transactions, their network performance of the consensus pool, etc. have been seen to grow to the point that the blockchain does not perform well. Other blockchains may be less successful, and have a small number of participants. Where blockchains operate collectively, systems and methods according to the present embodiments may further advantageously realize the ability to terminate corrupted blockchains that are no longer useful, while improving the security of blockchains having a smaller number of participants.

Irrespective of the particular architecture/methodology of the blockchain, or of the distributed ledger, systems and methods according to the present embodiments realize still further advantages over conventional consumable tracking systems and techniques. In one example, where federal regulations exist that prevent unused controlled substances from being recycled, redistributed, or otherwise reused, a black market nevertheless exists for selling such controlled substances that should have been destroyed. Through the advantageous techniques of the present embodiments, disposition of the status of a particular consumable is easier to transparently and verifiably monitor, and appropriate parties may be given a timely alert upon the unauthorized transfer (e.g., theft) of a controlled substance, or an attempt to redistribute a controlled substance that is intended for destruction.

Even in cases where regulations lawfully allow the reuse of unused consumables, embodiments according to the present systems and methods have still further advantage that new potential consumers of the redistributed consumables may more reliably verify the history of the consumable, and also whether the correct handling procedures (e.g., encoded in respective transactions recorded on blockchain 102) have been followed before the consumable may reenter circulation.

Furthermore, the present embodiments are similarly useful regarding consumables in other fields, such as with regard to weapons (e.g., firearms) that are often subject to destruction orders, but are sometimes found back in circulation after the weapon is reported as being destroyed. In such instances, the weapon itself may include its own ID that is encoded with the relevant transactions, and the present systems and methods thus provide a more reliable record to be consulted to track the status of the weapon such that an accurate chain-of-title may be established therefor. In the case where the weapon is intended for physical destruction, the present systems and methods advantageously allow for easier identification of the weapon, and the identity of the trusted party responsible for its destruction, if the weapon reappears on the black market in contravention of the law.

According to the embodiments described above, the present systems and methods may also be advantageously implemented with respect to hyper ledgers, which represent a cross-industry collaboration to develop blockchains and/or distributed ledgers having improved performance and reliability capable of supporting global business transactions by major technological, financial, and supply chain companies. Hyperledgers integrate independent open protocols and standards through a framework of use-specific modules, including blockchains having their own consensus and storage routines, in addition to service modules for identity, access control, and smart contracts.

The systems and methods described herein therefore allow for the ability to more securely encode the consumptions of materials or data, and track and execute the encoded transactions in immutable distributed ledgers that are more reliable than conventional systems, while also providing greater transparency. The details of the materials, data, or other consumables, including the condition or configuration thereof, may be asserted through secure off-chain interfaces, or alternatively may be encoded directly into each transaction submitted to the digital ledger. The present systems and methods, by cryptographically protecting transactions and recording the cryptographically protected transactions on blockchain, may operate as a stand-alone system, or may advantageously complement conventional material management processes and tracking techniques. Different from conventional systems, the present embodiments assure that persons responsible for physical material management steps, or virtual data entry, are trusted parties that physically or virtually execute the relevant associations, deliveries, and other status changes of the tracking system. Each such trusted party will therefore have its own secure ID (e.g., public and private keys, or equivalent token mechanism) which is included in each relevant transaction that results in a change of status of the respective consumable goods.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tracking system for monitoring, using a distributed ledger, the status of an original consumable good having a lifecycle, the original consumable good including a tangible material having a finite physical quantity capable of being finally consumed, destroyed, dissipated, wasted, or spent, and the lifecycle spanning a genesis of the original consumable good and a final state of consumption or disposal of the original consumable good, the system comprising:
   a receiver subsystem including (i) a receiver store configured to hold all or some of the original consumable good, and (ii) a receiver processor configured to submit to the distributed ledger a genesis transaction encoding details regarding an initial delivery of the original consumable good to the receiver store; and
   a distributor subsystem including (i) a distributor store configured to receive at least a distribution portion of the original consumable good from the receiver subsystem, and (ii) a distributor processor configured to submit to the distributed ledger a first update transaction, based on the genesis transaction, encoding details regarding the receipt of the distribution portion by the distributor store from the receiver store,
   wherein the tracking system further comprises a ledger processor and a memory in operable communication with the ledger processor, wherein the memory is configured to store computer-executable instructions, which, when executed by the ledger processor, cause the ledger processor to:
      validate the genesis transaction, submitted to the distributed ledger prior to the initial delivery of the original consumable good to the receiver store, as a genesis transaction block of the distributed ledger;
      add at least one transaction entry block to the distributed ledger for each transaction related to the consumable good, including a first update transaction block for the first update transaction validated on the distributed ledger, wherein each of the at least one transaction entry blocks functions to generate a visible immutable history within the distributed ledger of disposition, consumption, and movement of the consumable good through the lifecycle;
      track the original consumable good through the lifecycle from the submission of the genesis transaction to the final state of the original consumable good;
      verify, in response to an inquiry from an outside party regarding a status of the consumable good, at least one transaction entry block of the visible immutable history;
      record, in the visible immutable history on the distributed ledger, a final transaction entry verifying that the original consumable good has transitioned to the final state, wherein the final transaction entry includes a termination date of the lifecycle defined as the date of the final transaction entry; and
      validate the final transaction entry on the distributed ledger as a disposal transaction block to provide a verification to the outside party (i) of completion of the lifecycle for the original consumable good, and (ii) that the original consumable good is irreversibly unavailable for further consumption;
   wherein the distributed ledger comprises a blockchain,
   wherein submission of the genesis transaction to the blockchain generates the genesis transaction block including a cryptographic digital signature,
   wherein validation and recordation of the disposal transaction block on the blockchain (i) indicates that the finite physical quantity has been reduced, and (ii) prevents, after the termination date of the lifecycle, further transaction entry blocks from being added to the blockchain relating to a change in disposition, movement, or consumption of the finite quantity of the consumable good, and
   wherein the blockchain is configured to (i) validate one or more of the genesis transaction block and the first update transaction block using one of a consensus model and a registration model, and (ii) add at least one block to the blockchain for each respective validated transaction.

2. The system of claim 1, wherein the blockchain is configured to execute a transaction validation using a public key infrastructure.

3. The system of claim 1, wherein transaction details are encoded into one or more of the genesis transaction and the first update transaction by one of (i) direct encoding, and (ii) assertion through a secure off-chain interface device.

4. The system of claim 1, wherein the distributor store is further configured to distribute a consumption portion of the distribution portion to a consumer and the distributor processor is configured to submit to the distributed ledger a second update transaction, based on the genesis transaction, encoding details confirming receipt of the consumption portion by the consumer from the distributor store.

5. The system of claim 4, wherein the distributed ledger is configured to receive a third update transaction, based on the genesis transaction, encoding details regarding an irreversible final disposition of the consumption portion after confirmation of receipt of the consumption portion from the distributor store by the consumer, wherein the third update transaction is received by the distributed ledger prior to the final transaction entry.

6. The system of claim 5, further comprising a storage facility configured to receive from the distributor store at least a storage portion of the distribution portion, and to execute at least one action to (i) internally redistribute all or part of the received storage portion within the storage facility, (ii) return all or part of the received storage portion to the distributor store, (iii) distribute all or part of the received storage portion to the consumer as the consumption portion, and (iv) ship all or part of the received storage portion to a disposal facility.

7. The system of claim 6, wherein the storage facility further comprises a storage processor configured to submit to the distributed ledger a fifth update transaction, based on the genesis transaction, encoding details confirming execution of the at least one action.

8. The system of claim 6, wherein the storage facility comprises a plurality of separate storage units.

9. The system of claim 1, wherein the encoded transaction details include one or more of a date, a time, a sender location, a sender ID, a recipient location, a recipient ID, a measurement of the finite physical quantity of the original consumable good, and instruction for consumption of the original consumable good, and a secure ID of a trusted party for at least one of the sender and the recipient.

10. The system of claim 1, wherein the tracking system is further configured to monitor a status of all or part of the original consumable good throughout the system and transmit an alert upon detection of an unauthorized change in the status.

11. The system of claim 1, wherein the distribution subsystem comprises a pharmacy and the consumable good comprises a pharmaceutical material.

12. The system of claim 1, further comprising an originator subsystem configured to originate the original consumable good and deliver the original consumable good to the receiver subsystem, wherein the genesis transaction further encodes details regarding the creation of the original consumable good from an originator processor of the originator subsystem.

13. A method of tracking the status of an original tangible consumable good having a finite physical quantity, through a lifecycle of the original tangible consumable good, the method implemented by a first processor of a plurality of participating processors in operable communication with a digital distributed ledger over a distributed network, the method comprising the steps of:

generating a digitally signed genesis transaction to the plurality of participating processors for verification, the genesis transaction comprising encoded information confirming an initiation of the lifecycle of the original tangible consumable good by a receiver, and submitting the genesis transaction to the digital distributed ledger for verification as a genesis transaction block on the digital distributed ledger;

delivering, after verification of the genesis transaction block, a distribution portion of the finite physical quantity to a distributor;

submitting, after the step of delivering, a delivery transaction to the digital distributed ledger for verification as a delivery transaction block on the digital distributed ledger, wherein the delivery transaction comprises encoded information confirming delivery of the distribution portion to the distributor;

distributing, after verification of the delivery transaction block, a consumption portion of the distribution portion to a consumer;

submitting, after the step of delivering, a distribution transaction block to the digital distributed ledger for verification as a distribution transaction block on the digital distributed ledger, wherein the distribution transaction comprises encoded information confirming receipt of the consumption portion by the consumer;

recording, after verification of the distribution transaction block, one or more consumption transactions, including a single final consumption transaction comprising encoded information regarding an irreversible final disposition of the consumption portion in the lifecycle;

validating (i) the one or more consumption transactions recorded on the digital distributed ledger sequentially as respective consumption transaction blocks, and (ii) the single final consumption transaction recorded on the digital distributed ledger as a disposal block distinct from the one or more respective consumption transaction blocks, wherein the disposal block includes a termination date of the lifecycle defined as the date of the single final consumption transaction;

generating a visible immutable history of disposition and movement of the original tangible consumable good and the consumption portion through the lifecycle, the visible immutable history comprising the verified genesis transaction block, the delivery transaction block, the distribution transaction block, and the disposal block; and verifying, in response to an inquiry from an outside party, completion of at least one of the verified genesis transaction block, the delivery transaction block, the distribution transaction block, and at least one consumption transaction block, wherein the irreversible final disposition of the consumption portion of the finite physical quantity of the original tangible consumable good is encoded within the disposal block, wherein validation of the disposal block (i) indicates in the visible immutable history that the consumption portion of the finite physical quantity has been reduced and is unavailable for further consumption after the termination date of the lifecycle, and (ii) prevents further consumption transaction blocks from being added to the visible immutable history in the digital distributed ledger regarding the consumption portion of the finite physical quantity of the original tangible consumable good.

14. The method of claim 13, wherein the single final consumption transaction is generated by the distributor, and further includes encoded details of the irreversible final disposition recorded using an ID of a trusted party of the distributor.

15. The method of claim 13, wherein the single final consumption transaction is automatically generated after an elapsed period of time indicated in encoded information of a previous consumption transaction of the one or more consumption transactions.

16. The method of claim 14, further comprising, after the step of delivering and before the step of distributing, a step of storing a storage portion of the distribution portion, and generating a storage transaction to the digital distributed ledger for verification as a storage transaction block on the digital distributed ledger, wherein the storage transaction comprises encoded information confirming a status of the storage portion.

17. The method of claim 16, wherein the step of storing comprises a substep of updating an inventory status of the storage portion.

\* \* \* \* \*